United States Patent Office 3,397,904
Patented Aug. 20, 1968

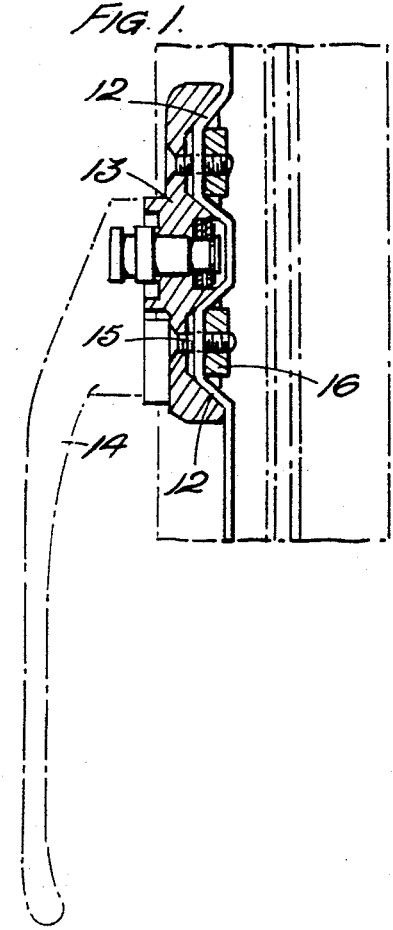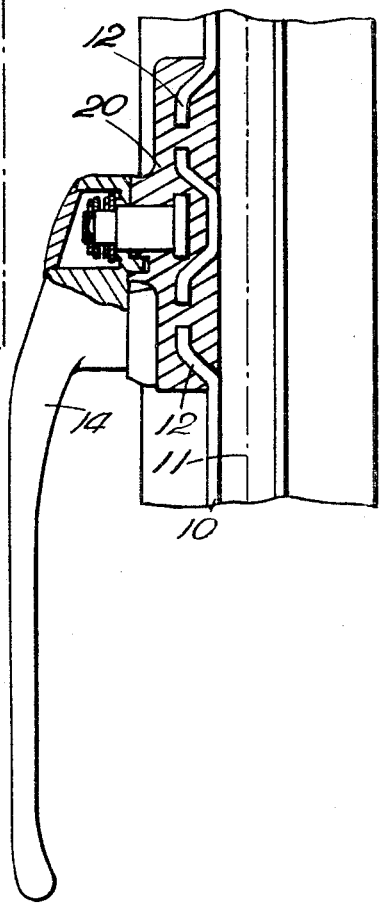

3,397,904
CHANNEL MEMBER FIXINGS
Henry Ernest Evans, Slough, England, assignor to N. V.
Appleton (U.K) Limited, Slough, England, a British
company
Filed Aug. 5, 1965, Ser. No. 477,487
Claims priority, application Great Britain, Sept. 16. 1964,
37,883/64
5 Claims. (Cl. 287—189.36)

ABSTRACT OF THE DISCLOSURE

A window frame includes a glazing channel defining between its walls a space for the window glass, at least one lug pressed outwardly from one wall of the channel to leave a recess between the lug and the space for the glass, and an element fixed to the lug by means which enter the recess but which do not project into the space for the glass.

---

The invention relates to a fixing of an element to a wall of a channel member and provides a fixing comprising at least one lug pressed outwardly from the wall of the channel member to leave a recess or depression behind the lug and an element rigidly attached to the lug.

In one form of the invention, the element is attached to the lug by casting the element over and around said lug into the recess or depression.

In another form of the invention the element is attached to the lug by a nut and bolt, the bolt passing through the element and the lug and into the nut located in the recess or depression. The nut may be shaped to the configuration of the recess or depression and the shape may be such that, on tightening or loosening of the bolt, the nut will be held by the recess or depression against rotation.

Fixings in accordance with the invention have specific reference to the fixing of the shoes and the locking handles to the glazing channels of windows.

By way of example, two specific constructions of a fixing in accordance with the invention for fixing the locking handles to the glazing channels will now be described with reference to the accompanying drawings in which:

FIGURE 1 shows an elevation of one of the handles rigidly attached to its respective glazing channel by one form of fixing, the fixing being shown in section, and FIGURE 2 is a similar view to that shown in FIGURE 1, the figure showing another form of fixing. With reference to FIGURE 1 the wall 10 of the glazing channel 11 is provided with two lugs 12 pressed outwardly from the surface thereof. A mounting 13 for the handle 14 is shaped to the outer configuration of the lugs and the adjacent portions of the wall of the channel and is rigidly attached to each lug 12 by means of a bolt 15 passing through an aperture in the mounting 13 and an aperture in the lug, the bolt 15 engaging a nut 16 located on the inner surface of the lug. The nuts 16 may be shaped as shown or may be shaped to the inner configuration of the lugs.

With reference to FIGURE 2, there is shown the same application as described above except that this figure shows another form of fixing in which the handle 14 is rigidly attached to each lug 12 by means of a mounting 20 which is cast around both of the lugs 12 and also passes through the apertures in the lugs.

In a form of the invention suitable for rigidly attaching one of the shoes to the glazing channel 11, two similar lugs are pressed outwardly from each upstanding wall of the channel and the shoe is attached to the channel 11 either by means of the bolts 15 and nuts 16 or by casting the shoe so that material flows over and around the lugs 12.

I claim:

1. A window frame comprising a glazing channel having walls which define a space of uniform section throughout the length of the channel for the glass to be fitted therein, at least one lug pressed outwardly from one wall of the channel to leave a recess between the lug and the said space, an element rigidly fixed to the said lug by means which enter said recess, the said fixing means only extending up to or short of the said space.

2. A window frame as claimed in claim 1 in which the element is a catch handle for retaining the window frame in its closed position.

3. A window frame as claimed in claim 1 in which the said fixing means comprises cast material, the said lug being embedded therein.

4. A window frame as claimed in claim 1 in which the said fixing means comprise a nut and bolt, the bolt passing through the element and the lug and into the nut, which nut is located wholly within the said recess.

5. A window frame as claimed in claim 4 in which the recess is of non-circular configuration and in which the nut is shaped to the configuration of the said recess whereby, on rotation of the bolt, the recess will preclude rotation of the nut.

References Cited

UNITED STATES PATENTS

| 1,828,402 | 10/1931 | Geyer | 85—1 |
| 2,286,950 | 6/1942 | Breedlove | 85—32 |
| 2,658,546 | 11/1953 | Crowther | 151—41.76 |
| 3,060,538 | 10/1962 | Simi | 85—32 |

CARL W. TOMLIN, *Primary Examiner.*

R. S. BRITTS, *Assistant Examiner.*